(12) United States Patent
Kato et al.

(10) Patent No.: US 10,738,753 B2
(45) Date of Patent: Aug. 11, 2020

(54) CONTROL DEVICE AND CONTROL METHOD FOR VEHICLE

(71) Applicant: TOYOTA JIDOSHA KABUSHIKI KAISHA, Toyota-shi (JP)

(72) Inventors: Hirokazu Kato, Nisshin (JP); Kensuke Nakanishi, Kiyosu (JP); Marina Aragi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 58 days.

(21) Appl. No.: 15/960,719

(22) Filed: Apr. 24, 2018

(65) Prior Publication Data

US 2018/0328331 A1    Nov. 15, 2018

(30) Foreign Application Priority Data

May 9, 2017  (JP) ................. 2017-093314

(51) Int. Cl.
*F02N 11/08* (2006.01)
*B60W 30/00* (2006.01)

(52) U.S. Cl.
CPC ......... *F02N 11/084* (2013.01); *F02N 11/087* (2013.01); *F02N 11/0818* (2013.01); *F02N 11/0822* (2013.01); *F02N 11/0829* (2013.01); *F02N 11/0833* (2013.01); *B60W 30/00* (2013.01); *F02N 11/0803* (2013.01); *F02N 2200/06* (2013.01); *F02N 2200/08* (2013.01); *F02N 2300/2011* (2013.01)

(58) Field of Classification Search
CPC .............. F02N 11/087; F02N 11/0829; F02N 2300/2011; F02N 11/0803; F02N 2200/08; F02N 2200/06; F02N 11/0818; F02N 11/084; F02N 11/0822; F02N 11/0833; B60W 30/00
USPC ........................................... 701/112
See application file for complete search history.

(56) References Cited

U.S. PATENT DOCUMENTS 4,286,683 A * 9/1981 Zeigner ................. B60K 15/00
  123/179.4
4,494,497 A * 1/1985 Uchida .................. F02D 17/04
  123/179.4

(Continued)

FOREIGN PATENT DOCUMENTS

JP    2010-121511       6/2010
JP    2011202616 A  * 10/2011 .......... F02N 11/0822

*Primary Examiner* — Sizo B Vilakazi
*Assistant Examiner* — Brian R Kirby
(74) *Attorney, Agent, or Firm* — Oblon, McClelland, Maier & Neustadt, L.L.P.

(57) ABSTRACT

A control device for a vehicle includes an electronic control unit. The electronic control unit executes control for prohibiting stop-and-start control until a predetermined period elapses after an ignition switch is turned ON. The electronic control unit executes scene-specific electric power supply control for operating a first function group that is a specific function and stopping a function other than the first function group in accordance with a state of the vehicle at a time when the ignition switch is turned OFF. The electronic control unit sets the predetermined period during which the stop-and-start control is prohibited longer in a case where the first function group is in an operating state than in a case where the first function group is not in an operating state when the ignition switch is turned ON.

7 Claims, 2 Drawing Sheets

(56) References Cited

U.S. PATENT DOCUMENTS

| | | | | |
|---|---|---|---|---|
| 6,358,180 B1* | 3/2002 | Kuroda | .................... | B60K 6/48 |
| | | | | 477/183 |
| 6,532,926 B1* | 3/2003 | Kuroda | ................ | B60W 10/30 |
| | | | | 123/179.4 |
| 2005/0103302 A1* | 5/2005 | You | ........................ | F02N 11/006 |
| | | | | 123/179.4 |
| 2005/0193747 A1* | 9/2005 | Kajimoto | ................ | B60H 1/322 |
| | | | | 62/133 |
| 2006/0184304 A1* | 8/2006 | Katou | .................. | B60W 10/02 |
| | | | | 701/54 |
| 2009/0062991 A1* | 3/2009 | Hayashikawa | ..... | F02N 11/0803 |
| | | | | 701/48 |
| 2011/0180031 A1* | 7/2011 | Hamane | .............. | F02N 11/0825 |
| | | | | 123/179.4 |
| 2012/0116657 A1* | 5/2012 | Kawamoto | ......... | F02N 11/0803 |
| | | | | 701/113 |
| 2012/0138006 A1* | 6/2012 | Gwon | ................. | F02N 11/0822 |
| | | | | 123/179.4 |
| 2013/0271276 A1* | 10/2013 | Okada | ................. | F02N 11/0814 |
| | | | | 340/441 |
| 2013/0311072 A1* | 11/2013 | Tochihara | ............... | F02D 45/00 |
| | | | | 701/112 |
| 2015/0260141 A1* | 9/2015 | Fujita | .................... | F02N 11/105 |
| | | | | 290/380 |
| 2016/0069317 A1* | 3/2016 | Koibuchi | .............. | F02N 11/084 |
| | | | | 701/112 |
| 2016/0096544 A1* | 4/2016 | Yamanaka | ........... | B62D 5/0481 |
| | | | | 701/41 |
| 2016/0311385 A1* | 10/2016 | Wojcik | .................... | B60R 16/03 |
| 2016/0356232 A1* | 12/2016 | Kim | ........................ | F02D 17/00 |
| 2017/0129534 A1* | 5/2017 | Sone | .................... | B62D 5/0463 |
| 2018/0234039 A1* | 8/2018 | Kuwahara | .............. | B62D 5/046 |

* cited by examiner

CONTROL DEVICE AND CONTROL METHOD FOR VEHICLE

INCORPORATION BY REFERENCE

The disclosure of Japanese Patent Application No. 2017-093314 filed on May 9, 2017 including the specification, drawings and abstract is incorporated herein by reference in its entirety.

BACKGROUND

1. Technical Field

The disclosure relates to a control device and a control method for a vehicle.

2. Description of Related Art

In a vehicle in which an engine (internal combustion engine) is mounted, stop-and-start control (hereinafter, also referred to as S&S control) for automatically stopping the engine when a predetermined automatic stop condition is satisfied and automatically restarting the engine when a predetermined automatic restart condition is satisfied during the automatic stop of the engine is performed so that fuel consumption (fuel consumption rate) is reduced.

Known as a technique relating to the S&S control is a technique for restarting an engine in a case where a user performs ignition OFF (hereinafter, also referred to as IG-OFF) by operating an ignition switch (start button) during the S&S control and then performs ignition ON (hereinafter, also referred to as IG-ON) by operating the ignition switch again (refer to, for example, Japanese Unexamined Patent Application Publication No. 2010-121511 (JP 2010-121511 A)).

SUMMARY

In the S&S control according to the related art, the S&S control is prohibited for a few seconds so as to guarantee system operation after switching from the IG-OFF to the IG-ON. However, the prohibition does not continue throughout communication abnormality confirmation time. This is because an initial value is used as a communication value (communication initial value) until communication confirmation and the initial value is set to become a desired operation of the S&S control (S&S control prohibition) until communication confirmation immediately after the IG-OFF.

During electric power supply control according to the related art, the operation of the entire system (functions) of a vehicle is stopped (electric power supply OFF) once the ignition switch of the vehicle is turned OFF. Scene-specific electric power supply control differing from the electric power supply control according to the related art has been adopted.

The scene-specific electric power supply control is control for operating a specific function (such as EPS) and stopping an operation other than the specific function by causing IG-R for maintaining electric power supply and IG-P for turning OFF electric power supply in the case of IG-OFF during, for example, the traveling of a vehicle to function in parallel (refer to FIG. 3).

In a case where the scene-specific electric power supply control as described above is adopted, the state preceding IG-ON is divided into a case where the IG-P and the IG-R are OFF together and a case where solely the IG-P is OFF at a time of the IG-ON. In the case of the IG-ON from a state where the TG-P and the TG-R are OFF together, the communication of the entire system is not operated before the IG-ON, and thus no problem arises even when the S&S control is prohibited until the elapse of a communication initial value from the IG-ON as in the related art. In the case of the IG-ON from a state where solely the IG-P is OFF, however, the communication of the system (specific function) operated during the IG-R is put into an operating state. As a result, in the case of communication disruption at a time of the IG-ON, the S&S control needs to be prohibited until a communication abnormality is confirmed. When the prohibition time during which the S&S control is prohibited becomes the same condition (communication initial value) as in the case of the IG-P and the IG-R being OFF together, the S&S control may be operated in a state where there is a possibility that a system abnormality remains. Accordingly, a desired operation of the S&S control cannot be guaranteed in some cases.

The disclosure provides a control device and a control method allowing a region where S&S control can be executed to be ensured after the operation of a system is guaranteed, even in a case where a specific function is in an operating state at a time of IG-ON, in a vehicle adopting scene-specific electric power supply control.

A first aspect of the disclosure relates to a control device for a vehicle. The vehicle is provided with an engine and an ignition switch. The control device includes an electronic control unit. The electronic control unit is configured to execute stop-and-start control for automatically stopping the engine when the electronic control unit determines that a predetermined automatic stop condition is satisfied and automatically restarting the engine when the electronic control unit determines that a predetermined automatic restart condition is satisfied during the automatic stop of the engine. The electronic control unit is configured to execute control for prohibiting the stop-and-start control until a predetermined period elapses after the ignition switch is turned ON. The electronic control unit is configured to execute scene-specific electric power supply control for operating a first function group that is a specific function and stopping a function other than the first function group in accordance with a state of the vehicle at a time when the ignition switch is turned OFF. The electronic control unit is configured to set the predetermined period during which the stop-and-start control is prohibited longer in a case where the first function group is in an operating state than in a case where the first function group is not in an operating state when the ignition switch is turned ON.

According to the first aspect of the disclosure, the predetermined period during which the stop-and-start control is prohibited is set longer in a case where the first function group (such as EPS) that is the specific function is in the operating state than in a case where the first function group is not in the operating state when the ignition switch is turned ON (hereinafter, also referred to as IG-ON). As described above, the period during which the stop-and-start control is prohibited is set to different values in a case where the first function group is in an operating state and a case where the first function group is not in an operating state at a time of the IG-ON. As a result, in a case where the first function group is in an operating state at a time of the IG-ON, the period during which the stop-and-start control is prohibited after the IG-ON can be set to a period considering a case where communication disruption arises, that is, a period until it can be guaranteed that the operation of the entire system is normal. Accordingly, a region where the stop-and-start control can be executed can be ensured after the operation of the system is guaranteed.

In the control device according to the first aspect of the disclosure, the state of the vehicle may include traveling of the vehicle being in progress or a shift range being a traveling range and the electronic control unit may be configured to also stop the operation of the first function group when the vehicle is stopped or the shift range becomes a non-traveling range in a case where the first function group is operated when the ignition switch is turned OFF.

According to the first aspect of the disclosure, unnecessary electric power consumption can be further reduced. In addition, the region where the stop-and-start control can be executed can be further expanded, and thus fuel economy can be further improved.

In the control device according to the first aspect of the disclosure, the electronic control unit may set the predetermined period during which the stop-and-start control is prohibited in a case where the first function group is in the operating state when the ignition switch is turned ON to a period until the first function group is put into a non-operating state after the ignition switch is turned ON.

According to the first aspect of the disclosure, in a case where the first function group is in an operating state at a time of the IG-ON, the stop-and-start control is prohibited during the period until the first function group is put into the non-operating state after the IG-ON, that is, a trip. Accordingly, the system operation can be further reliably guaranteed.

A second aspect of the disclosure relates to a control method for a vehicle. The vehicle is provided with an engine, an ignition switch, and an electronic control unit. The control method includes executing, by the electronic control unit, stop-and-start control for automatically stopping the engine when the electronic control unit determines that a predetermined automatic stop condition is satisfied and automatically restarting the engine when the electronic control unit determines that a predetermined automatic restart condition is satisfied during the automatic stop of the engine, executing, by the electronic control unit, control for prohibiting the stop-and-start control until a predetermined period elapses after the ignition switch is turned ON, executing, by the electronic control unit, scene-specific electric power supply control for operating a first function group that is a specific function and stopping a function other than the first function group in accordance with a state of the vehicle at a time when the ignition switch is turned OFF, and setting, by the electronic control unit, the predetermined period during which the stop-and-start control is prohibited longer in a case where the first function group is in an operating state than in a case where the first function group is not in an operating state when the ignition switch is turned ON.

According to the aspects of the disclosure, the region where the stop-and-start control can be executed can be ensured after the operation of the system is guaranteed, even in a case where the specific function is in the operating state at a time of the IG-ON, in the vehicle adopting the scene-specific electric power supply control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to accompanying drawings.

Figure 1:
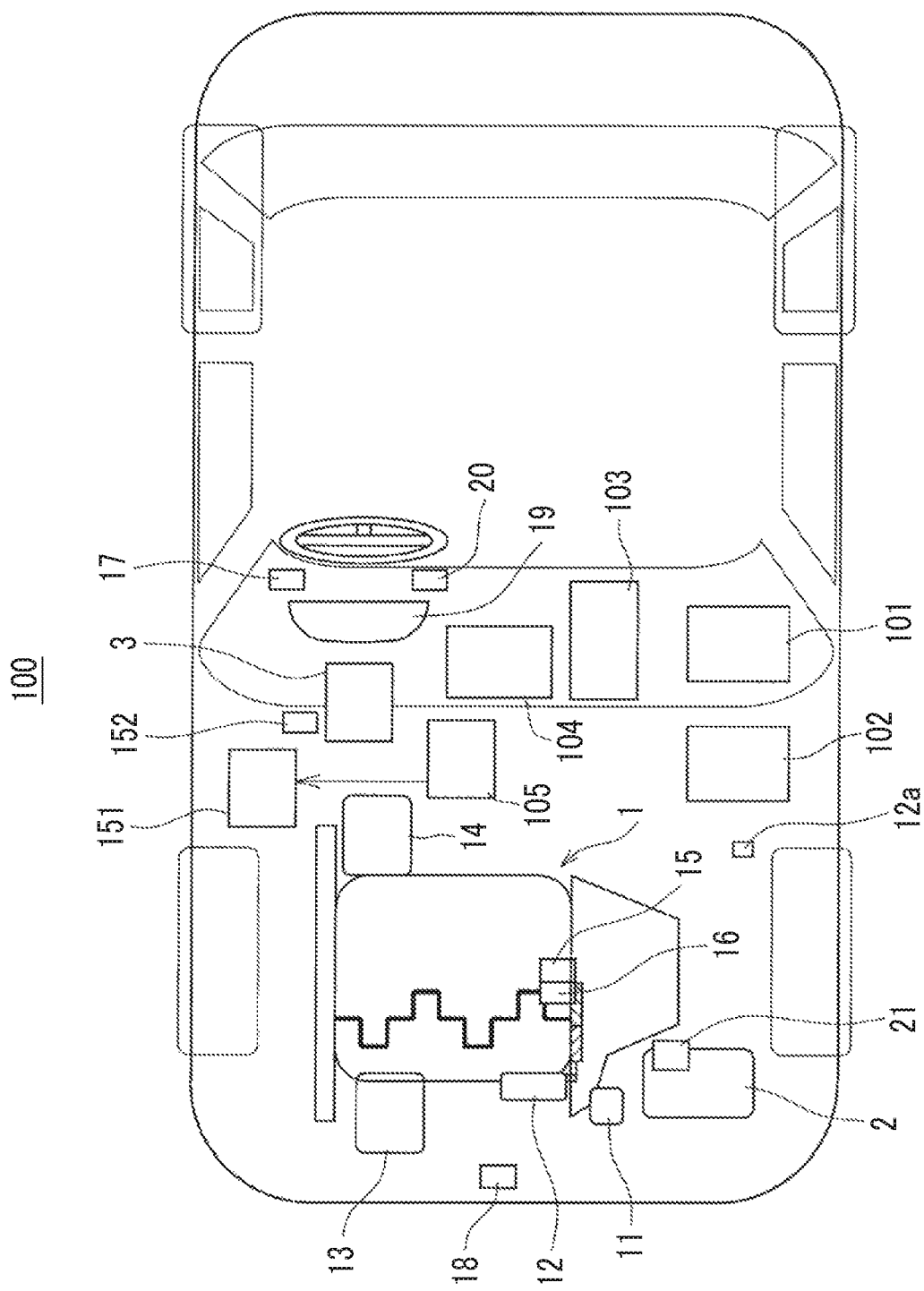
FIG. 1 is a schematic configuration diagram illustrating an example of a vehicle to which a control device according to an embodiment of the disclosure is applied.

An example of a vehicle to which a control device according to the embodiment is applied will be described first with reference to FIG. 1.

A vehicle 100 is provided with an engine (internal combustion engine) 1, a battery 2, an integrated electronic control unit (ECU) 101, an engine ECU 102, an eco-run ECU 103, an air conditioner ECU 104, a brake ECU 105, and so on.

The engine 1 is an engine that outputs power by fuel combustion such as a gasoline engine and a diesel engine.

An electric oil pump 11, a tandem starter 12, an air conditioner compressor 13, an alternator 14, a cam angle sensor 15, and a crank angle sensor 16 are disposed in the engine 1. The tandem starter 12 starts the engine 1 by consuming the electric power of the battery 2. In a case where the rotation speed of the engine is relatively high, the tandem starter 12 is capable of starting the engine 1, even during engine rotation, by extruding a pinion gear and causing the pinion gear to mesh with a ring gear after rotating the pinion gear. A starter that does not have a function to rotate a pinion gear may also be mounted.

The alternator 14 is a generator that generates electric power by rotating in conjunction with the rotation of a crankshaft. A belt is wound around the crankshaft and the rotary shaft of the alternator 14, and the alternator 14 rotates by using the power of the engine 1. The battery 2 is charged with the electric power that is generated by the alternator 14. A belt is wound around the air conditioner compressor 13 and the crankshaft, and the compressor 13 rotates by using the power of the engine 1.

Driven by the battery 2, the electric oil pump 11 prevents an engine oil from becoming biased during engine stop and cools the engine 1 during engine stop by circulating the engine oil when the engine is stopped.

The crank angle sensor 16 detects a crank angle, and the cam angle sensor 15 detects a cam angle. Cylinder identification can be performed by the crank angle and the cam angle being figured out. For example, a cylinder performing fuel injection and combustion when the engine is started can be identified by the timing when each cylinder reaches the compression top dead center being figured out. The crank angle sensor 16 is used for engine rotation speed detection.

The battery 2 is an electric power storage device (secondary battery) that can be charged and discharged. The battery 2 is, for example, a lead storage battery and supplies electric power to the electric oil pump 11, a brake hydraulic pump (not illustrated), the tandem starter 12, and each of the ECUs 101, 102, 103, 104, 105. The battery 2 is charged with the electric power generated by the alternator 14. The state of charge (SOC) of the battery 2 is monitored by a battery sensor 21.

The vehicle 100 is provided with an electric power steering (EPS) device 3. The electric power steering device 3 is provided with an assist motor (not illustrated), a decelerator (not illustrated), and so on. The assist torque that is generated by the assist motor is transmitted to a steering shaft via the decelerator.

In addition, an eco-run cancel switch 17 and a hood lock switch 18 are mounted in the vehicle 100.

The eco-run cancel switch 17 is a switch for canceling S&S control. The S&S control is turned OFF when a driver turns ON the eco-run cancel switch 17. The hood lock switch 18 is a sensor detecting whether or not an engine hood is locked. In a case where an engine hood unlock state is detected from the output of the hood lock switch 18, engine restart during the S&S control is prohibited as the driver cannot see the front.

An alarm message and various operation situations such as the S&S control are displayed on a meter panel 19. On the meter panel 19, a warning lamp is also turned on. An alarm message and an alarm sound may be output from a speaker as well as the meter panel 19.

The vehicle 100 is provided with an ignition switch 20. The ignition switch 20 receives a user operation for starting the drive system of the vehicle 100 (ignition ON operation) and a user operation for stopping the drive system (ignition OFF operation). In the following description, the ignition ON operation will be referred to as an "IG-ON" and the ignition OFF operation will be referred to as an "IG-OFF". In the case of the IG-ON, an IG-ON signal is output from the ignition switch 20 to the integrated ECU 101. In the case of the IG-OFF, an IG-OFF signal is output from the ignition switch 20 to the integrated ECU 101. The ignition switch 20 may be either a start switch (push switch) or an ignition key.

Figure 3:
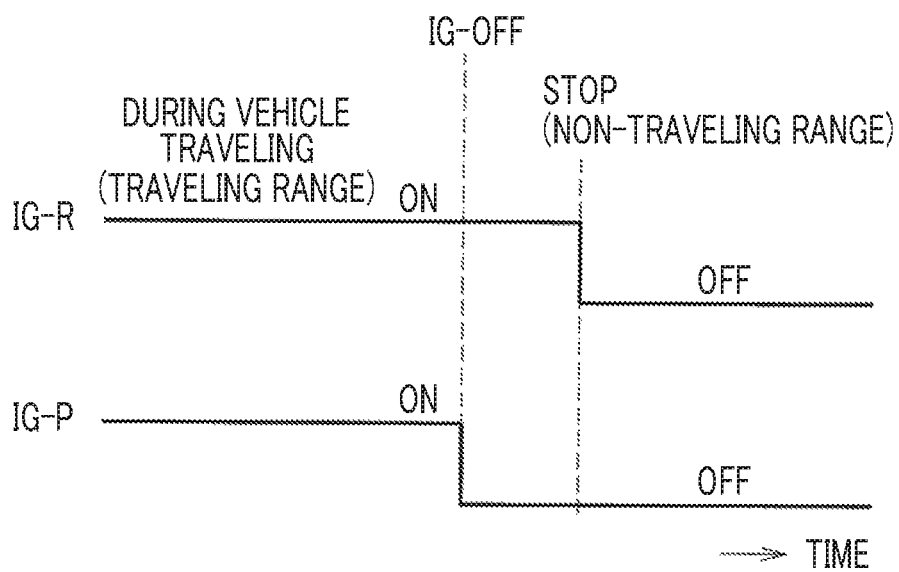
FIG. 3 is an explanatory diagram of IG-R and IG-P of scene-specific electric power supply control.

Scene-specific electric power supply control is adopted in this embodiment. During the scene-specific electric power supply control, the state of the vehicle 100 at a time of the IG-OFF resulting from the user operation of the ignition switch 20 is divided into IG-R (refer to FIG. 3) in which the electric power supply of a specific first function group (such as EPS) is maintained in an ON state and IG-P (refer to FIG. 3) in which the electric power supply of a function other than the first function group is put into an OFF state when traveling of the vehicle 100 is in progress or a shift range is a traveling range. During the scene-specific electric power supply control as described above, the IG-R is turned OFF when the vehicle 100 is stopped or when the shift range of the vehicle 100 becomes a non-traveling range as illustrated in FIG. 3. The scene-specific electric power supply control is executed by the integrated ECU 101.

ECU

As described above, the vehicle 100 is provided with the integrated ECU 101, the engine ECU 102, the eco-run ECU 103, the air conditioner ECU 104, the brake ECU 105, and so on.

Each of the ECUs 101, 102, 103, 104, 105 is provided with a central processing unit (CPU), a read-only memory (ROM) storing a program for controlling each portion and so on, a random access memory (RAM) temporarily storing data, an input-output interface, and so on. The CPU is configured to execute calculation processing based on, for example, the program and data stored in the ROM. The program for the control, the data, and so on are stored in the ROM. The RAM temporarily stores the result of the calculation by the CPU and so on.

The integrated ECU 101, the engine ECU 102, the eco-run ECU 103, the air conditioner ECU 104, and the brake ECU 105 described above are connected to be capable of communicating via an in-vehicle network such as a controller area network (CAN) or a dedicated line.

The integrated ECU 101 sends and receives a control command, a signal representing a control request value, detection signals of various sensors, and so on to and from the engine ECU 102, the eco-run ECU 103, the air conditioner ECU 104, and the brake ECU 105 and executes optimal vehicle drive force control, vehicle braking force control, and so on.

The engine ECU 102 executes various types of control for the engine 1, which include intake air amount control, fuel injection amount control, and so on, based on the output signals of various sensors detecting the operation state of the engine 1. A tandem starter drive relay 12a is connected to the engine ECU 102. The tandem starter 12 is operated and the engine 1 is started by the tandem starter drive relay 12a being energized by the engine ECU 102.

The eco-run ECU 103 is capable of executing the S&S control. The S&S control will be described later.

The air conditioner ECU 104 controls an air conditioner and performs air conditioning control during which a user controls an indoor temperature so as to reach a set temperature. In a case where the engine 1 is automatically stopped by the S&S control, the air conditioner ECU 104 stops the air conditioner compressor 13. As a result, the air conditioner switches to an air blowing function. The S&S control may be prohibited in a case where the air conditioning control is performed in a state where the difference between the set temperature and a target temperature is relatively large.

The brake ECU 105 controls the wheel cylinder pressure of each wheel by controlling a brake actuator (brake ACT) 151 (electronically controlled brake: ECB). The brake ECU 105 performs control relating to a stop maintenance function. The brake ECU 105 is also capable of executing each control regarding vehicle stability control (VSC), an antilock brake system (ABS), traction control (TRC), and so on.

A brake boost negative pressure sensor 152 is a sensor detecting the booster negative pressure that is formed by the intake negative pressure of the engine 1 being used. The driver's brake pedal effort is assisted by the booster negative pressure so that the driver steps on a brake pedal in a reliable manner.

Stop-and-Start Control

The S&S control executed by the eco-run ECU 103 will be described below.

During the S&S control, automatic stop from the idling operation state of the engine 1 and automatic restart of the engine 1 from the automatic stop state are performed.

Specifically, the engine 1 is automatically stopped when a predetermined automatic stop condition is satisfied during the operation of the engine 1. Examples of the automatic stop condition include an accelerator operation amount being "0" and the vehicle speed of the vehicle 100 being equal to or less than a predetermined vehicle speed V1 (V1>0). Once all of the above conditions are satisfied, a determination is made that the automatic stop condition is satisfied. Once the automatic stop condition is satisfied, the eco-run ECU 103 sends a stop signal to the engine ECU 102.

The automatic stop condition described above is an example and may be appropriately changed. For example, the automatic stop condition may also include the driver's brake operation state, an air conditioning state, the state of charge (SOC) of the battery 2, and so on.

The automatic restart of the engine 1 is performed once the automatic restart condition of the engine 1 is satisfied after the automatic stop of the engine 1. In a case where any one of the automatic stop conditions described above is not satisfied, a determination is made that the automatic restart condition is satisfied. Once the automatic restart condition is satisfied, the eco-run ECU 103 sends a restart signal to the engine ECU 102.

The S&S control includes S&S control executed during the traveling of the vehicle 100 (when the speed of the vehicle 100 exceeds V2 (V2<V1)) and S&S control executed while the vehicle 100 is stopped.

Post-IG-ON S&S Control

Firstly, in the related art, the S&S control is prohibited until a communication initial value (a few seconds) elapses for system operation guarantee after switching from the IG-OFF to the IG-ON as described above (hereinafter, also referred to as S&S prohibition control according to the related art).

In the vehicle 100 adopting the scene-specific electric power supply control, the state preceding the IG-ON has two types, one being the case of the IG-P and the IG-R being OFF together and the other being the case of solely the IG-P being OFF (the IG-R remaining ON), when the IG-ON results from the user operation of the ignition switch 20 as described above. In the case of the IG-ON from a state where the IG-P and the IG-R are OFF together, no problem arises even when the S&S control is prohibited until the elapse of the communication initial value from the IG-ON as in the S&S prohibition control according to the related art.

However, the communication operation state in the case of the IG-ON from a state where the IG-P and the IG-R are off together differs from the communication operation state in the case of the IG-ON from a state where solely the IG-P is OFF, and thus the S&S control may be operated in a state where there is a possibility that a system abnormality remains once the S&S control prohibition time becomes the same condition (communication initial value) as in the case of the IG-ON from a state where the IG-P and the IG-R are OFF together at a time of the IG-ON from a state where solely the IG-P is OFF.

In this embodiment, the time (period) during which the S&S control is prohibited after the IG-ON is set to different values in the case of the IG-ON from a state where the IG-P and the IG-R are OFF together and the case of the IG-ON from a state where solely the IG-P is OFF so that the above problem is addressed.

Figure 2:
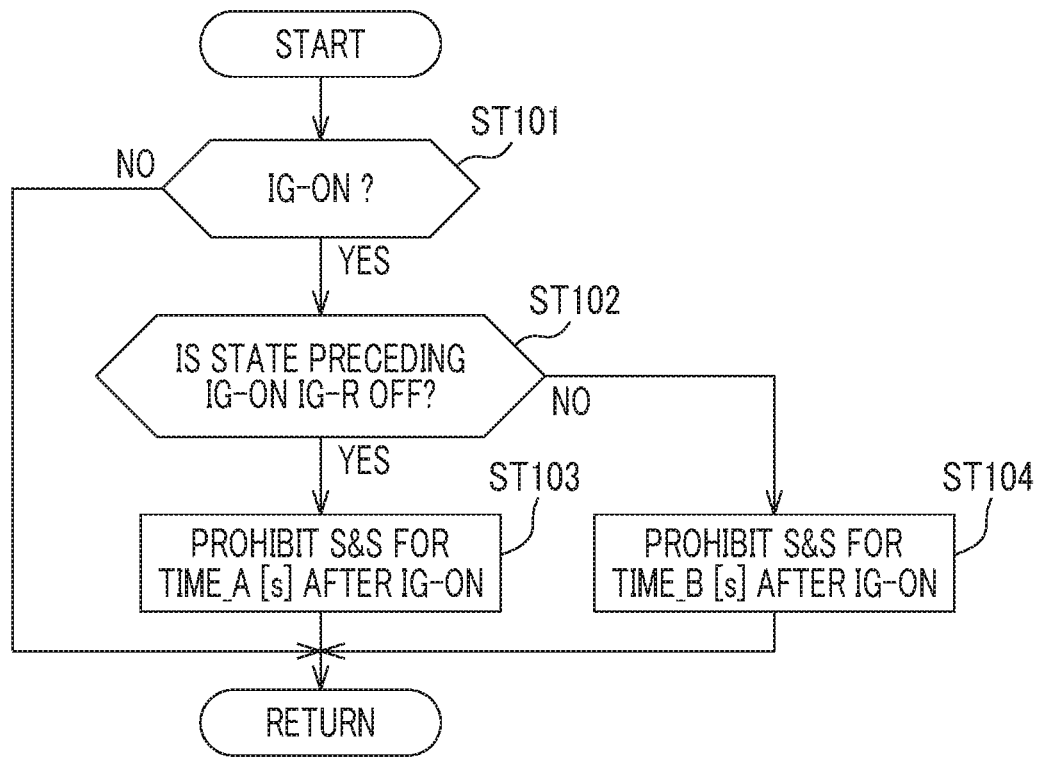
FIG. 2 is a flowchart illustrating an example of post-IG-ON S&S control executed by an eco-run ECU.

An example of the above-described control (post-IG-ON S&S control) will be described with reference to the flowchart that is illustrated in FIG. 2. The control routine illustrated in FIG. 2 is repeatedly executed at predetermined time intervals by the eco-run ECU 103.

Once the control routine illustrated in FIG. 2 is initiated, whether or not the current state is the IG-ON is determined first in Step ST101. Returning is performed in a case where the determination result is a negative determination (NO). The processing proceeds to Step ST102 in a case where the determination result in Step ST101 is a positive determination (YES) (in the case of the IG-ON).

In Step ST102, whether or not the state preceding the IG-ON is the IG-R being OFF is determined. The processing proceeds to Step ST103 in a case where the determination result is a positive determination (YES) (in a case where the state preceding the IG-ON is the IG-R being OFF).

In Step ST103, the S&S control is prohibited until time: TIME_A [s] elapses from the IG-ON. The TIME_A [s] used in Step ST103 is the same value as in the S&S prohibition control according to the related art described above (communication initial value: a few seconds).

The processing proceeds to Step ST104 in a case where the determination result in Step ST102 is a negative determination (NO) (in a case where the state preceding the IG-ON is the IG-R being ON).

In Step ST104, the S&S control is prohibited until time: TIME_B [s] elapses from the IG-ON. The TIME_B [s] used in Step ST104 is set to exceed the TIME_A [s]. The TIME_B [s] is time until it can be guaranteed that the communication operation of the entire system (every function including the first function group and the other functions) is normal, and a value obtained in advance through an experiment or simulation is set as the TIME_B [s].

Effect

As described above, in this embodiment, the time during which the S&S control is prohibited is set longer in a case where the first function group (such as EPS) is in an operating state than in a case where the first function group (such as EPS) is not in an operating state at a time of the IG-ON. As described above, the time during which the S&S control is prohibited is set to different values in a case where the first function group is in an operating state and a case where the first function group is not in an operating state at a time of the IG-ON. As a result, in a case where the first function group is in an operating state at a time of the IG-ON, the time during which the S&S control is prohibited after the IG-ON can be set to time considering a case where communication disruption arises, that is, time until it can be guaranteed that the operation of the entire system is normal. Accordingly, a region where the S&S control can be executed can be ensured after the operation of the system is guaranteed.

Another Example of Post-IG-ON S&S Control

In this example, the S&S control prohibition period is one trip in a case where the state preceding the IG-ON is the IG-R being ON (in a case where the determination result in Step ST102 is a negative determination (NO)) at a time of the IG-ON. One trip is a period until the IG-P and the IG-R are turned OFF together after the IG-P and the IG-R are turned ON together and is a period longer than the communication initial value described above.

When the IG-ON is performed from a state where the IG-R is ON (solely the IG-P is OFF) as described above, the system operation can be further reliably guaranteed insofar as the S&S control is prohibited during one trip.

In a case where the state preceding the IG-ON is the IG-R being ON at a time of the IG-ON, the S&S control prohibition period may be a plurality of trips.

The control according to this example, that is, the control during which the S&S control is prohibited during the trip in a case where the state preceding the IG-ON is the IG-R being ON at a time of the IG-ON is an example of "setting a predetermined period during which the stop-and-start control is prohibited to a period until the first function group is put into a non-operating state after the ignition switch is turned ON".

Another Embodiment

The embodiment disclosed above is illustrative in all respects and is not a basis for limited interpretation. Accordingly, the technical scope of the disclosure is not interpreted solely on the embodiment described above and is defined based on the description of the claims. The technical scope of the disclosure includes every change within the meaning and the scope equivalent to the scope of claims.

In the disclosure, the specific first function group is not particularly limited insofar as it is a function that needs to be operated when the IG-OFF is performed during the traveling of the vehicle 100 (or when the shift range is the traveling range). Examples of the specific first function group include the ECB and the VSC as well as the EPS.

The disclosure can be used in a control device for a vehicle in which stop-and-start control for automatically stopping an engine when a predetermined automatic stop condition is satisfied and automatically restarting the engine when a predetermined automatic restart condition is satisfied during the automatic stop of the engine can be executed.

What is claimed is:

1. A control device for a vehicle provided with an engine and an ignition switch, the control device comprising an electronic control unit configured to:
   execute stop-and-start control for automatically stopping the engine when the electronic control unit determines that a predetermined automatic stop condition is satisfied and automatically restarting the engine when the electronic control unit determines that a predetermined automatic restart condition is satisfied during the automatic stop of the engine,
   execute control for prohibiting the stop-and-start control until a predetermined period elapses after the ignition switch is turned ON by operation of a user,
   execute scene-specific electric power supply control for operating a first function group that is a specific function and stopping a function other than the first function group in accordance with a state of the vehicle at a time when the ignition switch is turned OFF by operation of the user, and
   set the predetermined period during which the stop-and-start control is prohibited longer in a first case than in a second case, the first case being a case where: (i) the first function group is in an operating state and the function other than the first function group is not in the operating state before the ignition switch is turned ON, and (ii) the first group is in the operating state and the function other than the first function group is not in the operating state when the ignition switch is turned ON, and the second case being a case where: (i) both of the first function group and the function other than the first function group are not in the operating state before the ignition switch is turned ON, and (ii) both of the first function group and the function other than the first function group are not in the operating state when the ignition switch is turned ON.

2. The control device according to claim 1, wherein:
   the state of the vehicle includes traveling of the vehicle being in progress or a shift range being a traveling range; and
   the electronic control unit is configured to also stop the operation of the first function group when the vehicle is stopped or the shift range becomes a non-traveling range in a case where the first function group is operated when the ignition switch is turned OFF by operation of the user.

3. The control device according to claim 1, wherein the electronic control unit sets the predetermined period during which the stop-and-start control is prohibited in a third case where the first function group is in the operating state when the ignition switch is turned ON by operation of the user to a period until the first function group is put into a non-operating state after the ignition switch is turned ON by operation of the user.

4. A control method for a vehicle provided with an engine, an ignition switch, and an electronic control unit, the control method comprising:
   executing, by the electronic control unit, stop-and-start control for automatically stopping the engine when the electronic control unit determines that a predetermined automatic stop condition is satisfied and automatically restarting the engine when the electronic control unit determines that a predetermined automatic restart condition is satisfied during the automatic stop of the engine;
   executing, by the electronic control unit, control for prohibiting the stop-and-start control until a predetermined period elapses after the ignition switch is turned ON by operation of a user;
   executing, by the electronic control unit, scene-specific electric power supply control for operating a first function group that is a specific function and stopping a function other than the first function group in accordance with a state of the vehicle at a time when the ignition switch is turned OFF by operation of the user; and
   setting, by the electronic control unit, the predetermined period during which the stop-and-start control is prohibited longer in a first case than in a second case, the first case being a case where: (i) the first function group is in an operating state and the function other than the first function group is not in the operating state before the ignition switch is turned ON, and (ii) the first group is in the operating state and the function other than the first function group is not in the operating state when the ignition switch is turned ON, and the second case being a case where: (i) both of the first function group and the function other than the first function group are not in the operating state before the ignition switch is turned ON, and (ii) both of the first function group and the function other than the first function group are not in the operating state when the ignition switch is turned ON.

5. The control device according to claim 1, wherein the predetermined period begins from a time the ignition switch is turned ON by operation of the user.

6. The control device according to claim 1, wherein the specific function includes at least one of an electric power steering, an electronically controlled brake, and a vehicle stability control.

7. The control device according to claim 1, wherein the electronic control unit is configured to set the predetermined period during which the stop-and-start control is prohibited longer in a third case than a fourth case, the third case being a case where the first function group is in the operating state at a time the ignition switch is turned from OFF to ON by operation of the user, the fourth case being a case where the first function group is not in the operating state at the time the ignition switch is turned from OFF to ON by operation of the user.

* * * * *